United States Patent [19]
Hopcroft

[11] 3,716,702
[45] Feb. 13, 1973

[54] MULTI-PARAMETER CONVERTING SLIDE RULE

[76] Inventor: Francis J. Hopcroft, Qtrs. 2520 F, Fort Lewis, Wash. 98433

[22] Filed: Dec. 3, 1971

[21] Appl. No.: 204,564

[52] U.S. Cl. .............................................. 235/70 R
[51] Int. Cl. ................................................ G06g 1/02
[58] Field of Search.....235/70 R, 70 A, 70 C, 78, 88, 235/89

[56] References Cited

UNITED STATES PATENTS

| | | | |
|---|---|---|---|
| 1,541,871 | 6/1925 | Stillman | 235/70 R |
| 1,632,505 | 6/1927 | Ritow | 235/70 R |
| 2,235,106 | 3/1941 | Hirano | 235/70 R |
| 2,445,464 | 7/1948 | Ailinger | 235/70 R |
| 2,534,695 | 12/1950 | Bland | 235/70 R |
| 3,544,768 | 12/1970 | Warner | 235/88 |

FOREIGN PATENTS OR APPLICATIONS

| | | | |
|---|---|---|---|
| 530,527 | 12/1940 | Great Britain | 235/88 |
| 1,029,281 | 5/1966 | Great Britain | 235/88 |
| 1,467,036 | 12/1966 | France | 235/89 X |

*Primary Examiner*—Richard B. Wilkinson
*Assistant Examiner*—Stanley A. Wal
*Attorney*—Gerald Altman et al.

[57] ABSTRACT

A slide rule is provided for use in converting dimensions in one measurement standard directly to dimensions in another measurement standard while performing mathematical operations. Dimensions given in feet and inches or in metric parameters can be multiplied together, cross-multiplied, divided individually or divided one by the other with an answer indicated directly on the appropriate scale in either parameter. The slide rule includes a body with a pair of rails and a slide movably mounted between the rails. An indicator with a hairline is slidably mounted to the body and conventional C and D scales are provided along the rails and along the slide. Additional C scales selectively folded for indicating in metric measure, foot measure or inch measure are provided along the body portion.

4 Claims, 3 Drawing Figures

MULTI-PARAMETER CONVERTING SLIDE RULE

BACKGROUND OF THE INVENTION

1. Field of the Invention

This invention relates generally to slide rules and more particularly is directed towards a slide rule adapted to carry out mathematical functions in either metric measure or in foot or inch measure with an answer provided directly in either parameter.

2. Description of the Prior Art

The slide rule is a very useful and commonly used device for quickly and easily solving mathematical problems of a wide variety. Heretofore, slide rules have been capable of handling measurements of one parameter only. When two different parameters are involved it is necessary to convert the measurement into a common parameter. With the growing acceptance of the metric measure, it is becoming increasingly necessary to work with both metric measure as well as measurements in feet and inches. However, the manipulation of measurements in different parameters is somewhat tedious and adds a step which may increase the chance of error in computations. While devices are available for converting measurements in one parameter to measurements in a different parameter, such devices do not have the capability of working mathematical functions of the sort possible with the slide rule.

Accordingly, it is an object of the present invention to provide a slide rule adapted to perform various mathematical functions using dimensions in different parameters, particularly metric measure and measurements in feet and inches, without recourse to converting to either parameter whereby the answer may be read directly off the appropriate scale in either desired parameter.

SUMMARY OF THE INVENTION

This invention features a slide rule comprised of a slide body having a pair of rails, a slide movably mounted to the slide body between the rails and a hairline indicator slidably mounted to the body. Conventional C and D scales are provided on the slide and on the slide body on each face and on the top and bottom edges of the slide and along the edges of the rails. Additional scales for metric measurements, foot measurements and inch measurements in the form of standard C scales folded at selected points are provided on the body aligned along the rails. A variety of calculations may be carried out using the same parameters or mixed parameters with the answer being available directly in either parameter by manipulation of the slide and the indicator.

DETAILED DESCRIPTION OF THE PREFERRED EMBODIMENT

Figure 1:
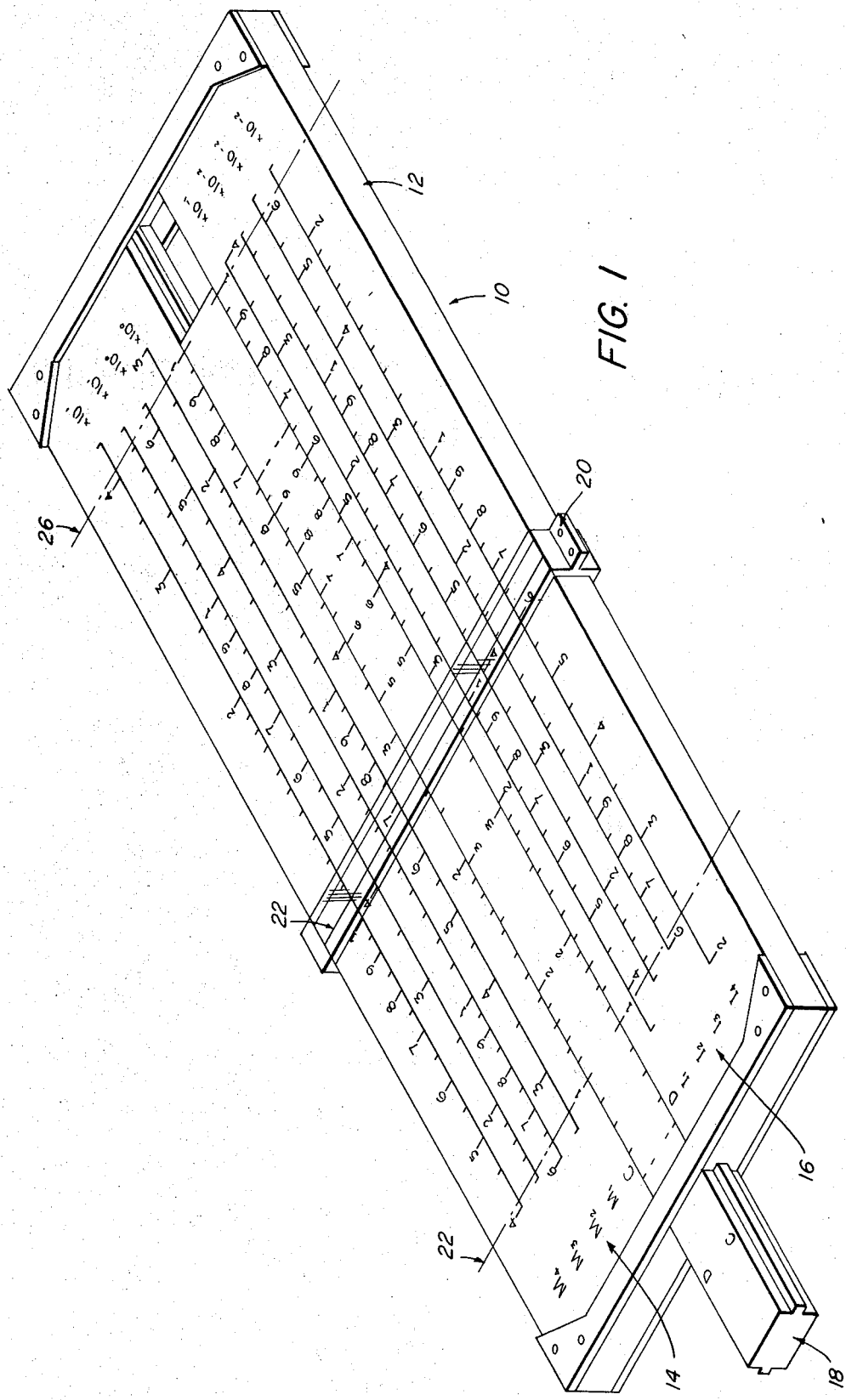
FIG. 1 is a view in perspective of a multi-parameter converting slide rule made according to the invention.

Referring now to the drawings, the reference character 10 generally indicates a slide rule made according to the invention and comprised of a body portion 12 having rigidly connected upper and lower rails 14 and 16, respectively, between which is a slide 18 adapted to be moved longitudinally along the rails. An indicator 20, typically of a transparent material, spans both faces of the rule and is provided with a hairline 22. The indicator is slidably mounted to the body as in a conventional slide rule. Left and right indicies 24 and 26, respectively, are determined by conventional C and D scales on each face of the top and bottom edges of the slide. Four indicies are provided on each face and are aligned to coincide exactly. C and D scales 28 and 30 are set along the slide body adjacent the edges of the rails 14 and 16 in close proximity to the slide 18. Matching C and D scales 32 and 34, respectively, are set along the slide edges adjacent to the rail edges. The slide D scale 34 is positioned opposite the fixed C scale 28 while the slide C scale is positioned opposite the fixed D scale 30. The C and D scales correspond with the C and D scales on the conventional slide rule and are utilized in the same manner for carrying out various mathematical operations.

Figure 2:
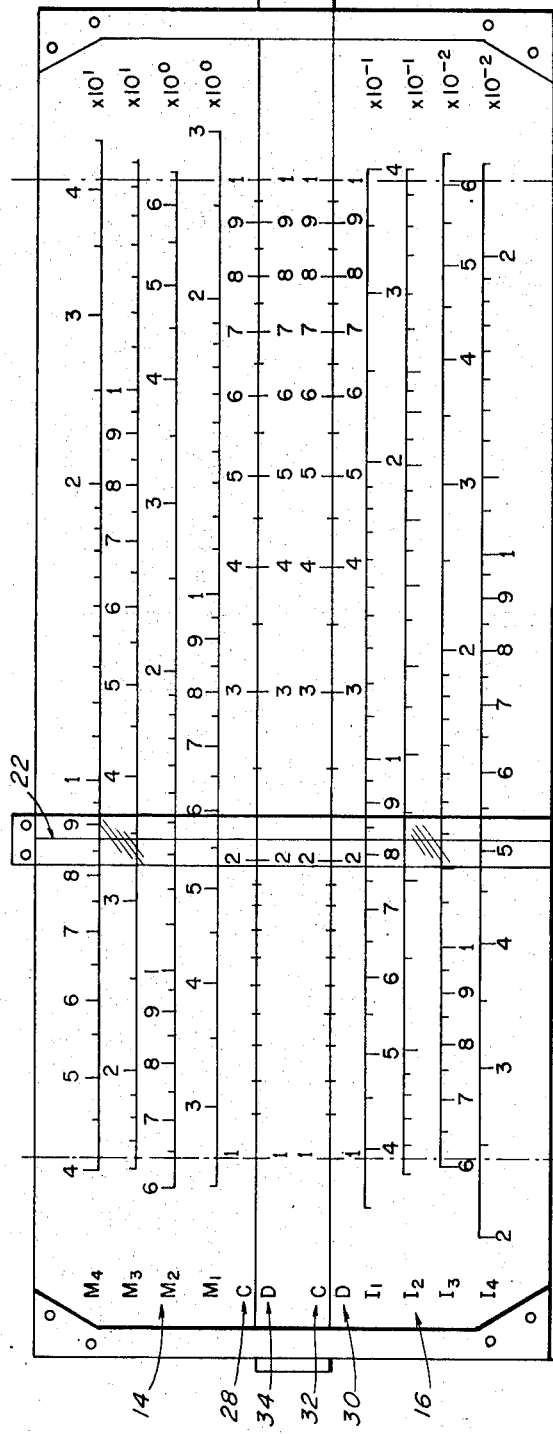
FIG. 2 is a front elevation of the front face of the slide rule of FIG. 1 and, FIG. 3 is a rear elevation showing the rear face of the rule.
Figure 3:
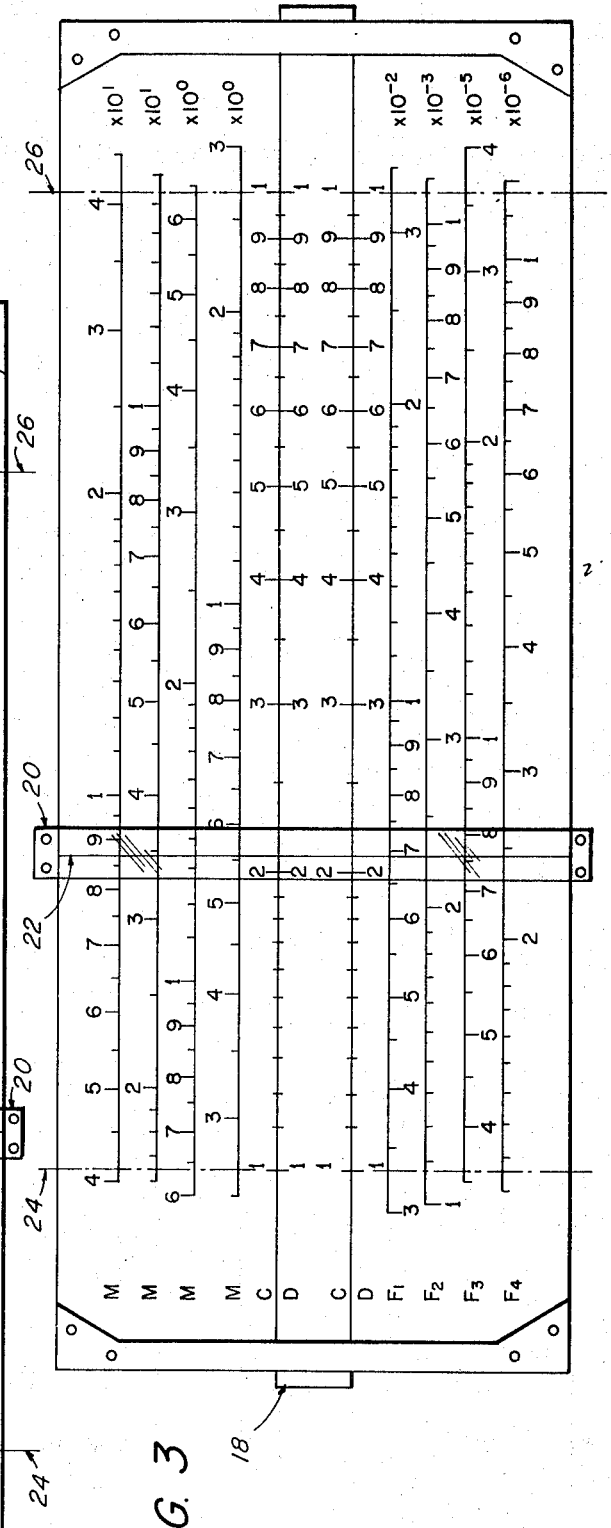

The upper rail 14, in addition to the C scale 28, also bears four metric scales $M_1$, $M_2$, $M_3$, and $M_4$, while the lower rail bears the scales $I_1$, $I_2$, $I_3$, and $i_4$, as best shown in FIG. 2. On the rear face of the slide rule, as shown in FIG. 3, the M scales are repeated as are the C and D scales, being identical to those appearing on the front face. However, on the lower rail of the rear face on the rule are additional scales $F_1$, $F_2$, $f_3$, and $F_4$. All of the M scales, I scales and F scales are standard C scales folded selectively at the points indicated below and aligned on the rails in the manner shown in FIGS. 1, 2 and 3.

The scales other than the C and D scales are folded at the following points.

| Scale | Folded at |
|---|---|
| $M_1$ | 2.540 |
| $M_2$ | 6.453 |
| $M_3$ | 16.387 |
| $M_4$ | 41.623 |
| $I_1$ | $3.937 \times 10^{-1}$ |
| $I_2$ | $1.550 \times 10^{-1}$ |
| $I_3$ | $6.102 \times 10^{-2}$ |
| $I_4$ | $2.402 \times 10^{-2}$ |
| $F_1$ | $3.280 \times 10^{-2}$ |
| $F_2$ | $1.076 \times 10^{-3}$ |
| $F_3$ | $3.529 \times 10^{-5}$ |
| $F_4$ | $1.157 \times 10^{-6}$ |

The C and D scales on the slide and on the rails are used for all calculations. The numbers are multiplied or divided and all calculations are made on the C and D scales without regard to dimensional parameters. Thus to find the area of a rectangle 2 inches long by 3 centimeters wide, the operator sets the left index 24 of the slide C scale over the numeral "2" on the fixed D scale 30. The indicator 20 is then moved to set the hairline 22 over the numeral "3" on the C scale and the dimensionless indicative "6" is read out on the D scale. The desired answer is then read on the $M_1$ scale if an answer is desired in the metric parameter or on the $I_1$ scale if an answer is desired in the inch parameter. Similarly, if the rectangle is 2 feet by 3 centimeters the answer could be read by turning over the rule and reading the answer on either the $M_1$ or the $F_1$ scale.

Third and fourth power calculations may be carried out in a similar manner on the C and D scales, the answer being read from the appropriate M, I or F scale.

The M scale is employed when throughout the course of the calculations only one number has been in the inch or foot parameter and all the rest of the numbers have been in the same metric parameter. Thus, the answer in metric parameters of the volume of a box 5 centimeters by 6 centimeters by 2 inches would be read off the $M_1$ scale directly over the dimensionless indicative "6" on the C scale of the upper rail.

Similarly, the $M_2$ scale would be employed to find the answer if two of the dimensions have been in the inch or foot parameters. Thus, the volume of a box 5 centimeters by 2 inches by 2 inches would be read on the $M_2$ scale directly over the dimensionless indicative "2" on the upper C scale.

The $M_3$ and $M_4$ scales are used in the same manner for making calculations involving three or four dimensions respectively in the inch or foot parameters when the answer is desired in the metric parameter. Thus, the volume of a box 2.3 inches by 5.1 inches by 6.9 inches could be read in the metric parameter directly off the $M_3$ scale by setting the hairline over the dimensionless indicative "8.09" on the C scale and reading the answer on the $M_3$ scale.

The I scales are employed to convert the dimensionless indicative to the inch parameter.

The $I_1$ scale is used to find the answer in the inch parameter when only one of the dimensions involved is in the metric parameter. Thus, the volume in the inch parameter of a box 5 centimeters by 2 inches X 2 inches will be read off the $I_1$ scale directly under the dimensionless indicative "2" located on the D scale on the lower rail. Similarly the $I_2$ scale is used when two of the dimensions are in the metric parameter and the answer is desired in the inch parameter. Thus, the volume in the inch parameter of a box 5 centimeters by 6 centimeters by 2 inches would be found on the $I_2$ scale directly beneath the dimensionless indicitive "6" on the D scale on the lower rail.

The $I_3$ and $I_4$ scales are used in a like manner when 3 or 4 of the dimensions used are in the metric parameter and the result is desired in the inch parameter. Thus, the volume of a box to 2.3 centimeters by 5.1 centimeters by 6.9 centimeters could be read directly on the $I_3$ scale by setting the hairline over the resulting dimensionless indicative "8.09" on the lower D scale and reading the answer on the $I_3$ scale.

Since feet and inches are not mutually compatible with metric units, and since the foot parameter is used as often as the inch parameter, it is useful to include the F scales to convert the dimensionless indicative to the foot parameter. Thus, the $F_1$ scale is used to convert the dimensionless indicative to feet when only one of the dimensions used in the calculations has been in the metric parameter. The $F_2$ scale is used when two dimensions in the calculation are in the metric parameter and the $F_3$ and $F_4$ scales are used in a like manner when three or four of the dimensions used are in the metric parameter.

Certain operating principles must be followed in the use of the instrument. First of all, when multiplying dimensions of mixed parameters, it is important to keep in mind that only two different parameters in any calculation or set of calculations can be handled at any one time. That is the metric dimensions must all be in centimeters or all meters or all milimeters, etc., but never combined in the same set of calculations. Thus, to multiply 3 centimeters by 5.9 meters X 3.2 centimeters it is necessary to convert the 5.9 meters to 590 centimeters before calculations can begin. Similarly feet or inches may be used as desired but only one at a time. Thus, to multiply 3 inches X 5.9 feet by 3.2 inches it is necessary to convert the 5.9 feet to 70.8 inches before calculations can begin.

When using the foot and inch parameters, it is important to note that the two are not able to be combined in a single dimension. Thus, 2 feet 3 inch must be converted either to 2.25 feet or 27 inches before calculations can be made.

Since the scales on the rule are based on ten and therefore divided into tenths, it is not possible to use the inch or foot parameter in fractions other than tenths. Accordingly, 2-⅛ inch must be converted to 2.125 inches and 5 feet 3 3/16 inch must be converted to 5.438 feet or 63.188 inches before starting the calculations. To this end tables are available or can readily be complied for use in converting inches to tenths of a foot and fractions of an inch into tenths of an inch.

Having thus described the invention what I claim and desire to obtain by Letters Patent of the United States is:

1. A multi-parameter converting slide rule, comprising
   a. first and second members connected for relative movement with respect to one another,
   b. an indicator connected to said rule for independent relative movement with respect to both of said members,
   c. each of said members bearing standard C and D slide rule scales in operative relation to one another and defining an index at the beginning and end of each scale,
   d. one of said members bearing additional C scales folded at preselected points with respect to said indices whereby a dimensionless indicative on one scale may be observed directly in a selected parameter on one of said folded scales.

2. A multi-parameter slide rule according to claim 1 wherein said folded scales are aligned with said indices to provide scale representations in at least two different parameters.

3. A multi-parameter slide rule according to claim 2 wherein one of said parameters is metric and another is in inch measurements.

4. A multi-parameter slide rule according to claim 2 wherein one of said parameters is metric and another is in foot measurements.

* * * * *